(12) United States Patent
Marche

(10) Patent No.: US 8,844,263 B2
(45) Date of Patent: Sep. 30, 2014

(54) AIRCRAFT TURBINE ENGINE AND USE OF SUCH A TURBINE ENGINE

(75) Inventor: Jacques Hervea Marche, Toulouse (FR)

(73) Assignee: Airbus Operations (SAS), Toulouse (FR)

(*) Notice: Subject to any disclaimer, the term of this patent is extended or adjusted under 35 U.S.C. 154(b) by 680 days.

(21) Appl. No.: 13/139,447

(22) PCT Filed: Jan. 5, 2010

(86) PCT No.: PCT/FR2010/050004
§ 371 (c)(1),
(2), (4) Date: Jun. 13, 2011

(87) PCT Pub. No.: WO2010/079294
PCT Pub. Date: Jul. 15, 2010

(65) Prior Publication Data
US 2011/0314788 A1 Dec. 29, 2011

(30) Foreign Application Priority Data
Jan. 7, 2009 (FR) ...................... 09 00032

(51) Int. Cl.
*F02K 3/06* (2006.01)
*B64D 27/12* (2006.01)
*B64D 27/16* (2006.01)
*F02C 6/20* (2006.01)
*F02C 3/113* (2006.01)
*B64D 29/06* (2006.01)
*F02C 7/36* (2006.01)
*B64D 33/02* (2006.01)

(52) U.S. Cl.
CPC . *F02K 3/06* (2013.01); *B64D 27/16* (2013.01); *F02C 6/206* (2013.01); *F02C 3/113* (2013.01); *F05D 2250/312* (2013.01); *B64D 2033/0286* (2013.01); *B64D 33/02* (2013.01); *B64D 29/06* (2013.01); *F02C 7/36* (2013.01)
USPC ........................... 60/226.1; 60/39.15; 244/55

(58) Field of Classification Search
USPC ............ 60/224, 225, 226.1–226.3, 230, 232, 60/39.15, 39.163, 796, 797; 244/55–56, 244/53 R
See application file for complete search history.

(56) References Cited

U.S. PATENT DOCUMENTS

| 4,598,543 A | 7/1986 | Brewer |
| 4,784,351 A | 11/1988 | Eickmann |

(Continued)

FOREIGN PATENT DOCUMENTS

| DE | 2903389 | 10/1979 |
| EP | 0798207 | 10/1997 |

(Continued)

OTHER PUBLICATIONS

European Patent Office, International Search Report PCT/FR2010/050004, Apr. 8, 2010 (2 pgs), Form PCT/ISA/237 (5 pgs.) English language translation of Form PCT/ISA/237 (6 pgs).

*Primary Examiner* — Andrew Nguyen
(74) *Attorney, Agent, or Firm* — Wood, Herron & Evans, LLP

(57) ABSTRACT

An aircraft wing turbine engine is designed to increase the ground clearance for larger modernized engines mounted under the wings of an airfoil. To this end, the aircraft wing turbine engine includes a hot flow generator with a turbine engine rotating about a first central axis, a cold flow blower rotating about a second central axis, and a pod surrounding the hot flow generator and cold flow blower. The first and second central axes are offset and non-collinear with each other such that the cold flow blower can be moved farther away from the ground to increase the ground clearance of the turbine engine.

4 Claims, 5 Drawing Sheets

(56) References Cited

U.S. PATENT DOCUMENTS

| | | | |
|---|---|---|---|
| 5,107,676 A * | 4/1992 | Hadaway et al. | 60/226.1 |
| 6,276,633 B1 * | 8/2001 | Balayn et al. | 244/56 |
| 7,107,756 B2 * | 9/2006 | Rolt | 60/224 |
| 2002/0178711 A1 * | 12/2002 | Martens | 60/226.1 |
| 2008/0053061 A1 * | 3/2008 | McCall | 60/226.1 |
| 2008/0098719 A1 * | 5/2008 | Addis | 60/226.1 |

FOREIGN PATENT DOCUMENTS

| | | |
|---|---|---|
| FR | 1405188 | 7/1965 |
| FR | 2791319 | 9/2000 |

* cited by examiner

AIRCRAFT TURBINE ENGINE AND USE OF SUCH A TURBINE ENGINE

This application claims priority, under Section 371 and/or as a continuation under Section 120, to PCT Application No. PCT/FR2010/050004, filed on Jan. 5, 2010, which claims priority to French Application No. 0900032, filed on Jan. 7, 2009.

TECHNICAL FIELD

The present invention relates to an aircraft turbine engine, as well as the use of such a turbine engine.

BACKGROUND

As known, modern turbine engines for aircrafts are efficient, although bulky, thereby increasing substantially the difficulty for mounting them on such aircrafts. Such a mounting difficulty is made worse due to the monobloc structure of such turbine engines. As a result, such a mounting operation is frequently to be associated with significant modifications and adaptations of the structure of said aircrafts and including of the airfoil of the engines.

However, such modifications and adaptations might not be desirable, for instance for technical matters and obvious cost reasons.

The present invention aims at solving such a drawback and more specifically, at making mounting such turbine engines on an aircraft easier.

SUMMARY OF THE INVENTION

To this end, according to the invention, the aircraft turbine engine comprising:
  a hot flow generator with an at least substantially horizontal axis, fastened to the airfoil of said aircraft through at least one fastener;
  a cold flow blower with an at least substantially horizontal axis, being rotated by said hot flow generator; and
  a pod surrounding said hot flow generator and said cold flow blower and forming a cold flow channel with an annular section around said hot flow generator,
is remarkable in that it comprises means being able to shift the axis of said blower transverse to the axis of said hot flow generator.

Thus, thanks to this invention, the structure and the shape of the turbine engine can be adapted, so as to make mounting thereof on an aircraft easier.

In the case where the blower is being rotated by the hot flow generator through a reducing mechanism, said shifting means advantageously consist in, at least in part, said reducing mechanism, so as to allow for the shifting of the axis of said blower transverse to the axis of said hot flow generator.

Said reducing mechanism could comprise an epicycloidal reducer and a straight reducer.

Obviously, the present invention further relates to the use of the aircraft turbine engine such as previously described.

Advantageously, when said turbine engine is hung to the airfoil of said aircraft via a suspension pylon, the axis of said blower could be shifted upwards transverse to the axis of said hot flow generator, so as to increase the ground clearance of said turbine engine.

Thus, in the particular case of re-motorization of an aircraft, this invention makes it possible to replace the existing turbine engines thereof with new modern (generally bulkier) turbine engines, while keeping as such the original airfoil of the turbine engines. Indeed, the upward shifting of the blower of the turbine engine allows the pod to be lifted without modifying the airfoil of the engine. The ground clearance of the turbine engine is then increased by a value equal to the shifting of the axis of the blower.

Alternatively, when said turbine engine is mounted on the airfoil of said aircraft, the axis of said blower can be shifted upwards transverse to the axis of said hot flow generator, so as to shift the air input from said turbine engine to the exterior. Thereby, the volume of air able to cross the air input of said turbine engine is increased, thus improving the performances thereof.

In another alternative of the present invention, said turbine engine being hung under the airfoils of said aircraft, the axis of said blower can be shifted downwards transverse to the axis of said hot flow generator, so as to shift the air input from said turbine engine to the exterior so as to increase the air volume penetrating into the latter.

Furthermore, the present invention also relates to an aircraft comprising at least one turbine engine such as previously described.

BRIEF DESCRIPTION OF THE DRAWINGS

The FIGS. of the appended drawings will better explain how this invention can be implemented. In these FIGS., like reference numerals relate to like components.

DETAILED DESCRIPTION

In an embodiment of the aircraft turbine engine according to this invention described with reference to FIGS. 1 to 3, the re-motorization of an aircraft is considered with modern and efficient engines, without modifying the airfoil of the original (less efficient) turbine engines and, more specifically, without modifying the wings, the suspension pylons, the fasteners on such pylons that remain unchanged. Such a re-motorization could be required, so as, for instance, to reduce the fuel consumption of the aircraft, increase the available power thereof, reduce the sound emissions thereof, etc.

Figure 1:
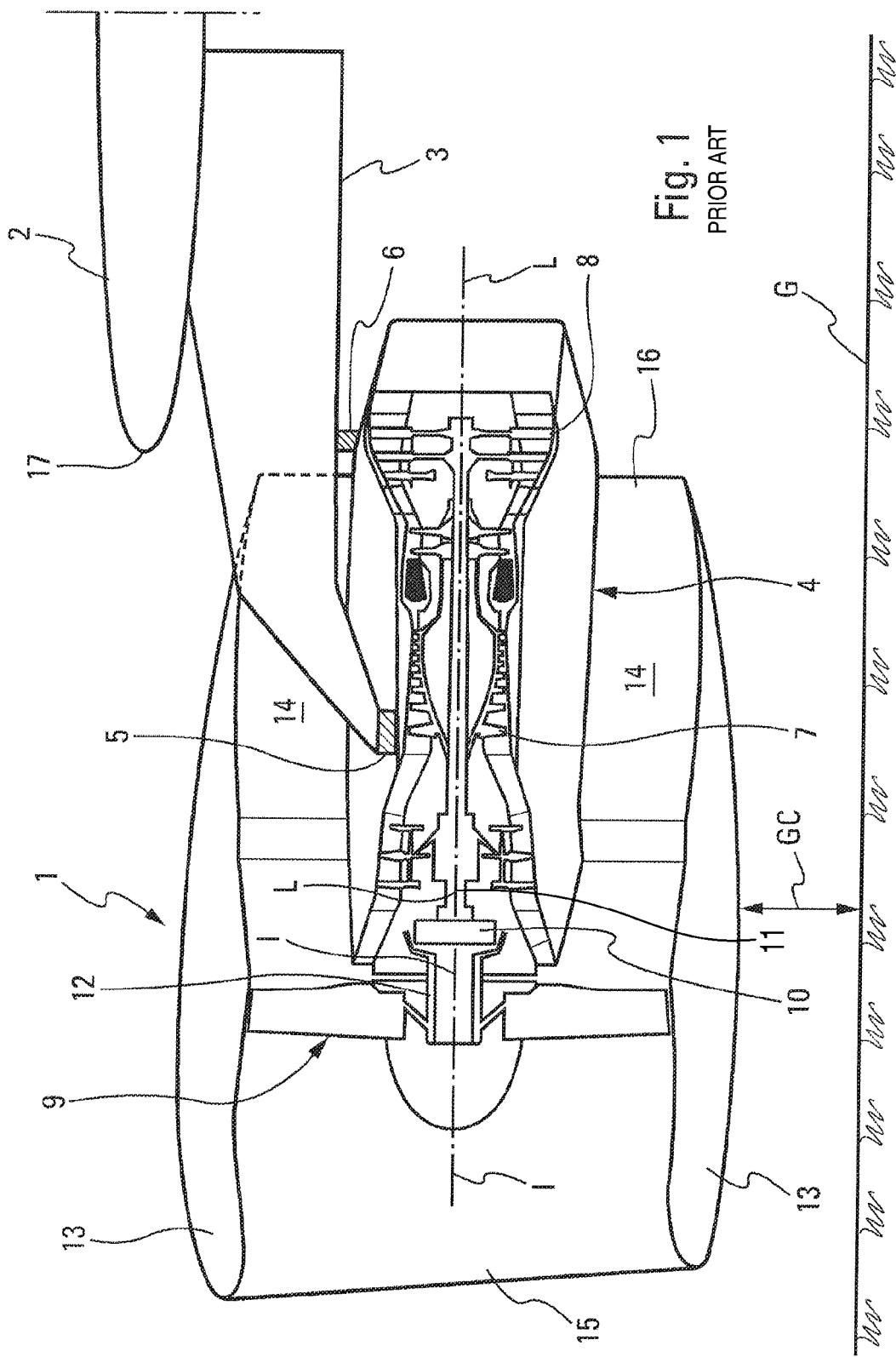
FIG. 1 is a side schematic longitudinal sectional view of a turbine engine being hung under the wing of an aircraft via a suspension pylon.

FIG. 1 shows a double flow turbine engine 1 fastened on the wing 2 of an aircraft via a suspension pylon 3.

Usually, as shown on FIG. 1, the double flow turbine engine 1 comprises:
  a hot flow generator 4 with an at least substantially horizontal axis L-L. The generator 4 is fastened through a front fastener 5 and a rear fastener 6 to the suspension pylon 3. The front fastener 5 and the rear fastener 6 are mounted on the generator 4 at the level respectively of a high-pressure compressor 7 and of a low-pressure turbine engine 8 of said generator 4;

a cold flow blower 9 with an at least substantially horizontal axis I-I. The axis l-l of the blower 9 matches the axis L-L of the hot flow generator 4. The latter rotates said blower 9, by means of a reducing mechanism 10 (for instance an epicycloidal gear reducer) mechanically connecting the driving shaft 11 of the generator 4 to the driving shaft 12 of the blower 9, the rotation speed of the blower 9 being lower than that of the generator 4; and a pod 13 surrounding the hot flow generator 4 and the cold flow blower 9 and forming a cold flow channel 14, being axisymmetric with respect to the axis l-l or L-L and having an annular section around said generator 4. The pod 13 is bounded at the ends thereof, respectively, by an air input hole 15 and by a cold flow output hole 16, being located at the front of the leading edge 17 of the wing 2.

Figure 2:
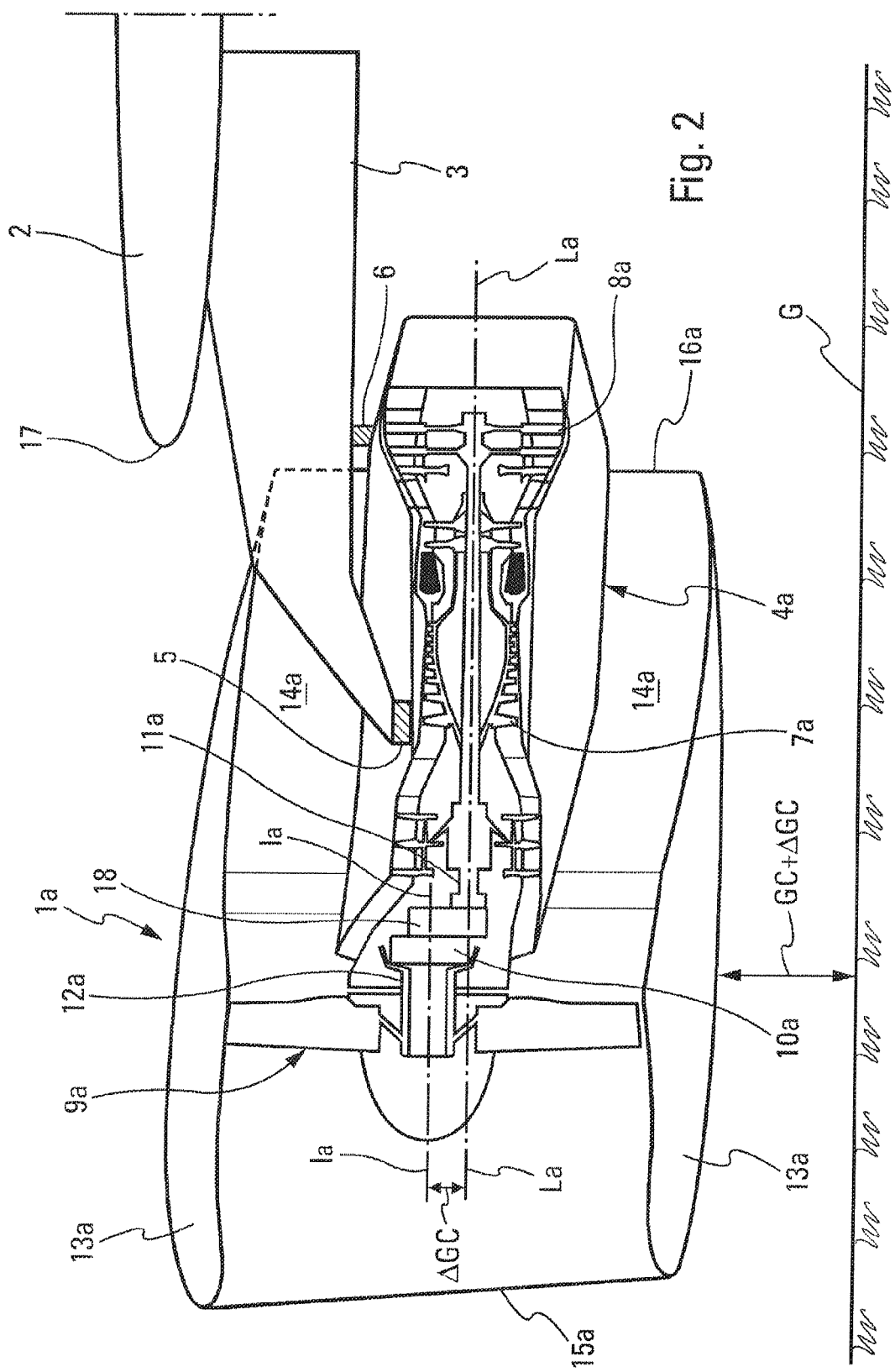
FIG. 2 is identical to FIG. 1, the wing turbine engine being according to an embodiment of the present invention.

As an illustrative numerical but not limitative example, the ground clearance of such a double flow turbine engine 1 (that is, the space between the ground G and the lowest point of the pod 13), designated by GC on FIG. 2, could be equal to 523 mm.

According to the invention, as shown on FIG. 2 (where the elements corresponding to the turbine engine on FIG. 1 respectively have the same reference, but with a suffix a), the axis la-la of the blower 9a has been shifted upwards transverse to the axis La-La of the hot flow generator 4, maintaining as such the characteristics of the suspension pylon 3 and the fastening points 5 and 6 of the aircraft (FIG. 1).

To this end, the usual reducing mechanism 10 of FIG. 1 has been replaced by an adapted reducing mechanism comprising, for instance, an epicycloidal reducer 10a and a straight reducer 18 associated with each other. Moreover, the epicycloidal reducer 10a and the straight reducer 18 are directly connected respectively to the driving shaft 12a of the blower 9a and the driving shaft 11a of the hot flow generator 4a. Obviously, other reducing mechanisms could also be contemplated.

Figure 3:
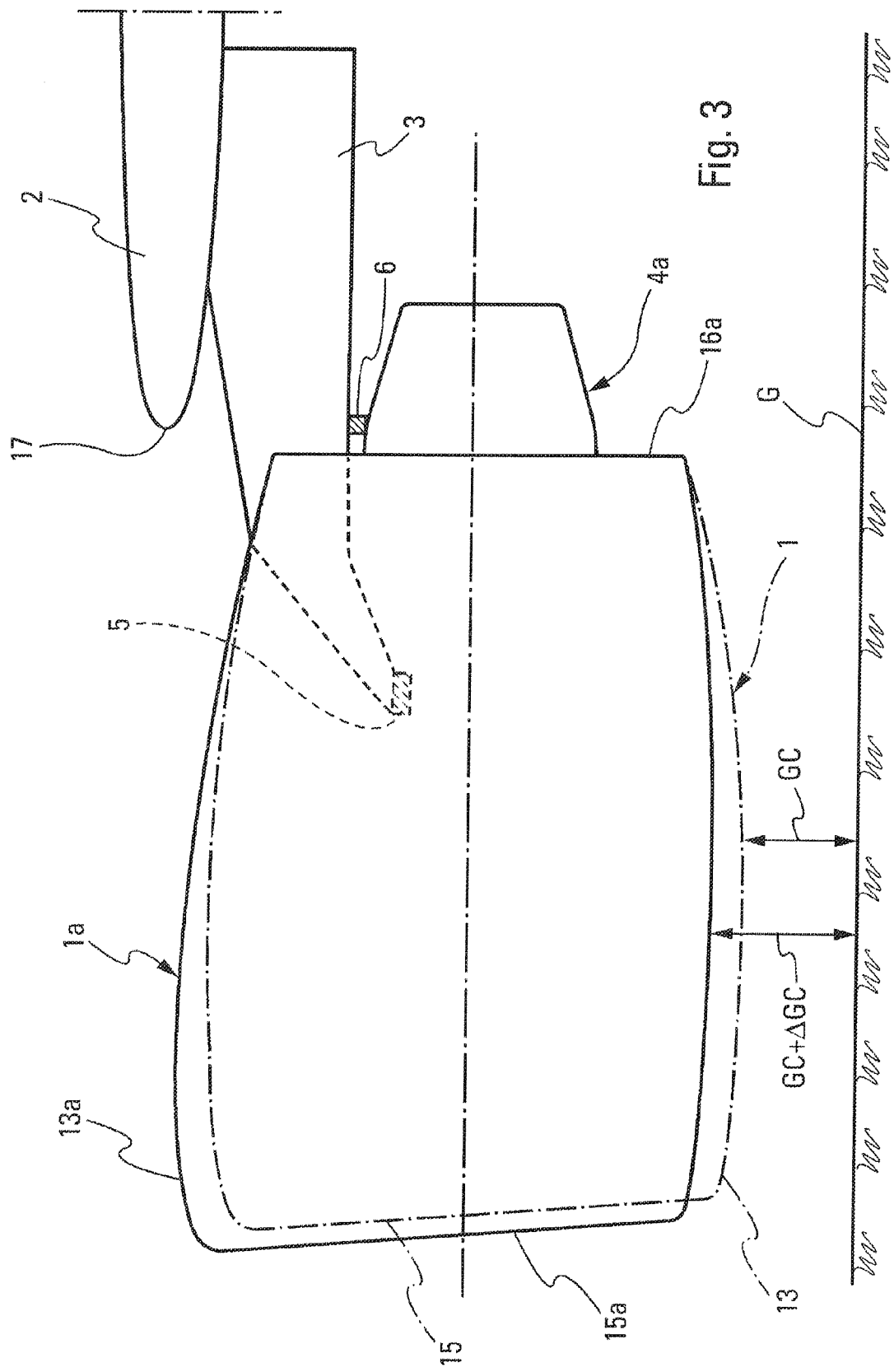
FIG. 3 shows, in a side schematic view, the wing turbine engine of FIG. 1 (in mixed line), as well as the wing turbine engine of FIG. 2 (in solid line) according to the present invention.

As shown on FIGS. 2 and 3, the upward shifting of the blower 9a allows the pod 13a of the turbine engine 1a to be lifted by a value equal to the shift of the axis la-la, without modifying either the suspension pylon 3 or the fasteners 5 and 6. As a result of the shifting of the blower 9a, a modification of the cold flow annular channel 14a is achieved, that is no longer axisymmetric.

Thus, thanks to this invention, the ground clearance of the turbine engine 1a is increased by AGC, corresponding to the upward shifting value of the axis la-la of the blower 9a.

According to the above mentioned numerical example, such a shifting could be equal to 150 mm, so that the ground clearance GC+ΔGC of the turbine engine 1a becomes equal to 673 mm.

Figure 4:
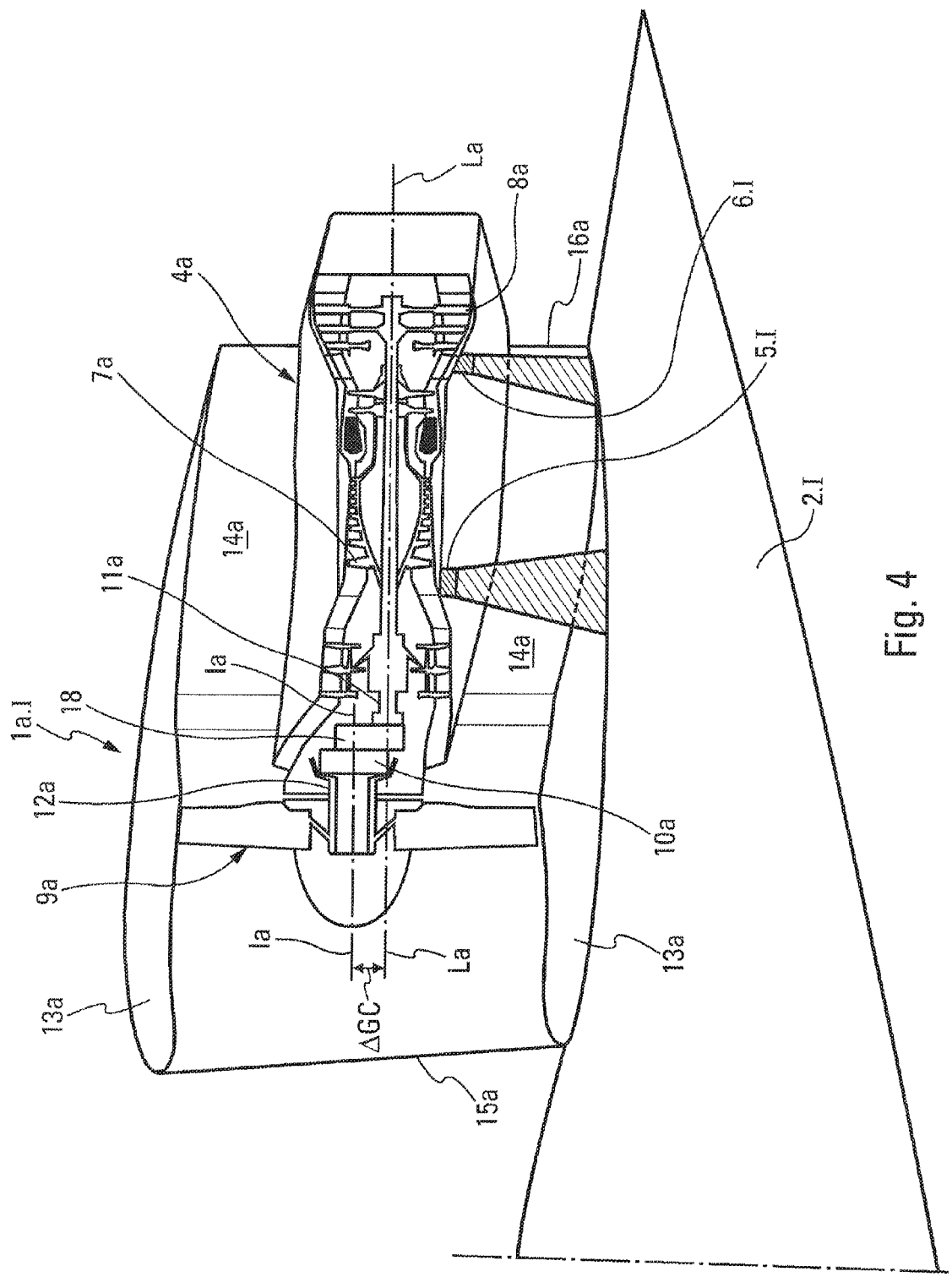
FIG. 4 is a side schematic longitudinal sectional view of a turbine engine mounted on the airfoil of an aircraft, in accordance with another embodiment according to the present invention.

In another embodiment according to this invention illustrated on FIG. 4, the turbine engine 1a.I is mounted on the airfoil 2.I of an aircraft. The hot flow generator thereof is fastened to the airfoil 2.I through front and rear fasteners (5.I, 6.I). The axis la-la of the blower 9a is shifted upwards by AGC, transverse to the axis La-La of the hot flow generator 4a, so as to substantially increase the volume of air crossing the air input 15a. Thereby, the filling of the turbine engine 1a.I with air is improved.

Figure 5:
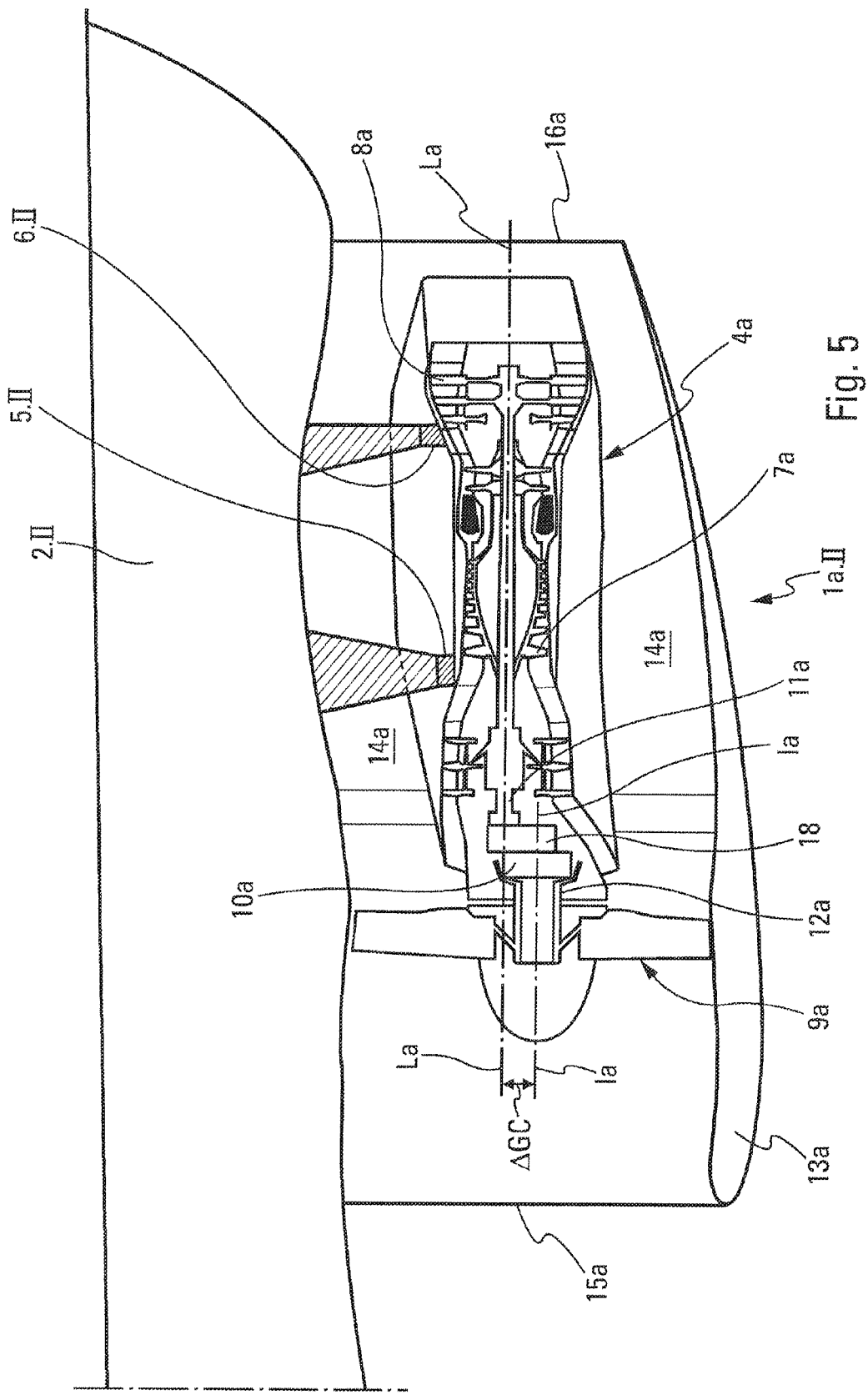
FIG. 5 shows, in a side schematic longitudinal sectional view, a turbine engine being hung under the airfoil of an aircraft, still according to another embodiment of the present invention.

Furthermore, as shown on FIG. 5, still another embodiment of the present invention provides a turbine engine 1a.II under a wing 2.II of an aircraft. Such a turbine engine 1a.II is fastened under the wing 2.II through a front fastener 5.II and a rear fastener 6.II, both mounted on the hot flow generator 4a. The axis la-la of the blower 9a is shifted downwards by GC, transverse to the axis La-La of the hot flow generator 4a, so as to substantially increase the volume of air crossing the air input 15a. The filling of the turbine engine 1a.I with air is thereby improved.

The invention claimed is:

1. An aircraft wing turbine engine system configured to be mounted on an aircraft airfoil, comprising:

a hot flow generator including a first driving shaft and a turbine engine, said hot flow generator defining an at least substantially horizontal first central axis about which said first driving shaft and said turbine engine rotate, and said hot flow generator fastened to the airfoil of the aircraft via at least one fastener;

a cold flow blower including a second driving shaft and blades, said cold flow blower defining an at least substantially horizontal second central axis about which said second driving shaft rotates, said cold flow blower mounted relative to said hot flow generator such that said second central axis is vertically offset and non-collinear with said first central axis and such that said first and second central axes are generally parallel to one another and the second central axis is located at a different distance relative to the airfoil than the first central axis;

said first driving shaft being coupled at its forward end with said second driving shaft such that said cold flow blower is rotated by said turbine engine of said hot flow generator; and a pod surrounding both of said hot flow generator and said cold flow blower, said pod defining an annular cold flow channel in the form of an elongated generally annular space around each of said cold flow blower and said hot flow generator.

2. The aircraft wing turbine engine according to claim 1, further comprising:

a mechanical reducing mechanism that couples said first driving shaft to said second driving shaft, thereby shifting rotational movement of said hot flow generator to said cold flow blower.

3. The aircraft wing turbine engine according to claim 2, wherein said mechanical reducing mechanism comprises an epicycloidal reducer and a straight reducer.

4. An aircraft, comprising:

a fuselage;

at least one wing defining an airfoil;

a suspension pylon extending from said airfoil; and an aircraft wing turbine engine system configured to be mounted on the suspension pylon, comprising:

a hot flow generator including a first driving shaft and a turbine engine, said hot flow generator defining an at least substantially horizontal first central axis about which said first driving shaft and said turbine engine rotate, and said hot flow generator fastened to said airfoil via at least one fastener;

a cold flow blower including a second driving shaft and blades, said cold flow blower defining an at least substantially horizontal second central axis about which said second driving shaft rotates, said cold flow blower mounted relative to said hot flow generator such that said second central axis is vertically offset and non-collinear with said first central axis and such that said first and second central axes are generally parallel to one another and the second central axis is located at a different distance relative to the airfoil than the first central axis;

said first driving shaft being coupled at its forward end with said second driving shaft such that said cold flow blower is rotated by said turbine engine of said hot flow generator; and a pod surrounding both of said hot flow generator and said cold flow blower, said pod defining an annular cold flow channel in the form of an elongated generally annular space around each of said cold flow blower and said hot flow generator.

* * * * *